(12) United States Patent
Trzcinski

(10) Patent No.: US 10,517,430 B1
(45) Date of Patent: Dec. 31, 2019

(54) MULTI-RADIUS CURVE ROLLOVER FRYING PAN

(71) Applicant: Kenneth J. Trzcinski, Hillrose, OH (US)

(72) Inventor: Kenneth J. Trzcinski, Hillrose, OH (US)

(*) Notice: Subject to any disclaimer, the term of this patent is extended or adjusted under 35 U.S.C. 154(b) by 0 days.

(21) Appl. No.: 16/104,429

(22) Filed: Aug. 17, 2018

(51) Int. Cl.
*A47J 37/10* (2006.01)
*A47J 45/07* (2006.01)

(52) U.S. Cl.
CPC .............. *A47J 37/10* (2013.01); *A47J 45/071* (2013.01)

(58) Field of Classification Search
CPC .......... A47J 37/00–10; A47J 45/00–071; A47J 36/00; B65D 81/343; B65D 81/3438; B65D 81/3446
USPC ........................................... 220/573.1–573.5
See application file for complete search history.

(56) References Cited

U.S. PATENT DOCUMENTS

| 781,081 | A | * | 1/1905 | MacFate | B65D 81/3222 |
| | | | | | 222/129 |
| 1,398,655 | A | * | 11/1921 | Smith | A47J 37/10 |
| | | | | | 99/423 |
| D380,934 | S | * | 7/1997 | Alarid, Jr. | A47J 37/101 |
| | | | | | D7/354 |
| D381,555 | S | * | 7/1997 | Baker | A47J 37/101 |
| | | | | | D7/354 |
| 6,237,470 | B1 | * | 5/2001 | Adams | A47J 37/101 |
| | | | | | 220/573.1 |
| 6,497,174 | B1 | * | 12/2002 | Cacace | A47J 37/10 |
| | | | | | 99/395 |
| D497,767 | S | * | 11/2004 | Cacace | A47J 37/101 |
| | | | | | D7/361 |
| 6,829,984 | B1 | * | 12/2004 | Leibowitz | A47J 37/108 |
| | | | | | 99/339 |
| D507,454 | S | * | 7/2005 | Leibowitz | A47J 37/101 |
| | | | | | D7/354 |
| D557,063 | S | * | 12/2007 | Delaquis | A47J 37/101 |
| | | | | | D7/361 |
| 8,353,243 | B2 | * | 1/2013 | Lee | A47J 37/10 |
| | | | | | 220/573.1 |
| D798,651 | S | * | 10/2017 | Yu | A47J 37/101 |
| | | | | | D7/361 |

* cited by examiner

*Primary Examiner* — Kareen K Thomas
(74) *Attorney, Agent, or Firm* — Williams Intellectual Property; Benjamin F. Williams

(57) ABSTRACT

A mutli-radius curve rollover frying pan, including a second hemi-circular side having a multi-radius curve cross-section along a first arcuate section and a second arcuate section to terminate at a second rim, is provided. The second rim is disposed substantially parallel the pan base but overhanging the first arcuate section. The multi-radius curve cross-section quickens towards the second rim whereby foodstuffs accelarated up the second hemi-circular side are gently inverted and rolled over at the second arcuate section maintaining contact with the pan. Flight of foodstuffs is minimized. Foodstuffs are inverted to complete rotation upon the slope of the first arcuate section before coming to rest under the influence of gravity on the cooking surface of the pan base. Force of impact is therefore minimized. Thus even delicate foodstuffs (such as eggs, for example) are readily inverted with minimal dexterity required and with minimal force applied to the pan proper.

4 Claims, 6 Drawing Sheets

MULTI-RADIUS CURVE ROLLOVER FRYING PAN

BACKGROUND OF THE INVENTION

Various types of frying pans and cookware are known in the prior art. Some are devised to facilitate inversion of foodstuffs and enable users to easily invert, mix, and rebound foodstuffs from the pan edges back to the pan center. For example, U.S. Pat. No. 1,398,655, issued to Smith, includes an overhanging lip devised to direct inversion of foodstuffs subjected to forced travel up the overhanging lip and thereby "flop over". However Smith teaches a circular cross-section with a lip overhanging the actual base of the frying pan. While foodstuffs accelerated up the circular cross-section are inverted thereby, said foodstuffs are yet deposited (with some force) on the horizontal pan base. In Smith's invention, foodstuffs necessarily lose contact with the pan during inversion and travel through the air at least partially to land on the horizontal surface of the pan base. Delicate foodstuffs (such as eggs) are therefore readily broken by such impact unless care is effected in subjecting the pan to the "sudden jerk" Smith necessarily requires (col. 2, lines 80 and 97).

U.S. Pat. No. 6,497,174, issued to Cacace, necessarily requires a curved side that terminates "substantially normal the cooking surface" (col. 2, line 26). Foodstuffs shunted up the side are forced into the air to enable rapid sautéing and deglazing.

U.S. Pat. No. 6,829,984, issued to Leibowitz, likewise makes use of a circular cross-section, devised to "flip" foodstuffs and deposit them back in the center of the pan. Further, Leibowitz's "lip" is "imperforate", that is, perforated to enable draining of the pan by tilting the pan in the direction of the lip whereby liquid is caused to drain through the perforations. Importantly, Leibowitz's motivation for aerial inversion (that is inversion effected without contact maintained with the pan) is set forth when he describes "[t]he lip 20 has a vertical radius of curvature less than that of the rim 14 (the vertical radius of curvature of the rim 14 being infinite in the case of a rim 14 extending exclusively vertically upwardly from the base 12)" whereby "the lip 22 then reverses the travel direction of the food and causes it to invert (see dashed arrow D [FIG. 2] so that what was once the top surface of the food now rests upon the base 12" and "so that the base 12 is in an appropriate position to receive the flipped food" (see col. 3).

Thus neither Smith, Cacace, nor Leibowitz are motivated to maintain contact of foodstuffs with the pan proper throughout inversion of the foodstuffs to gently invert foodstuffs by rolling them over and deposit them, not on the pan base, but on the sloped portion of a first arcuate section before returning them to the pan base. Neither do they teach, therefore, a multi-radius curve cross-section to effect such rolling inversion of foodstuffs whereby even delicate foodstuffs (such as eggs for example) are gently inverted by rolling over without impacting the pan base.

Smith, Cacacae, and Leibowitz all require abrupt motions, jerking, and sudden forcible action to effect the inversions of foodstuffs their structural limitations enable. See for example Leibowitz col. 3, lines 58-61; Cacace, col., lines 29-34; and Smith, col. 2, line 96.

The present invention, therefore, presents useful improvements in the cooking arts by enabling rolled inversion of foodstuffs with minimal dexterity and force applied to the pan proper.

FIELD OF THE INVENTION

The present invention relates to a mutli-radius curve rollover frying pan, and more particularly, to a mutli-radius curve rollover frying pan including a second hemi-circular side having a multi-radius curve cross-section along a first arcuate section and a second arcuate section wherein a second rim is disposed substantially parallel the pan base overhanging the first arcuate section. The multi-radius curve cross-section quickens towards the second rim whereby foodstuffs accelarated up the second hemi-circular side are gently inverted and rolled over in contact with the pan. Flight is minimized and the foodstuffs are inverted to complete rotation upon the slope of the first arcuate section before coming to rest under the influence of gravity on the cooking surface of the pan base. Thus even delicate foodstuffs (such as eggs, for example) are readily inverted with minimal dexterity and force applied to the pan proper.

SUMMARY OF THE INVENTION

The instant mutli-radius curve rollover frying pan has been devised to enable easy inversion of foodstuffs in a frying pan by application of minimal dexterity and force, whereby delicate foodstuffs (such as eggs for example) are inverted by gently rolling over without force of impact applied, as typically occurs when foodstuffs are flipped in a standard frying pan. The present multi-radius curve rollover frying pan, therefore, includes a second hemi-circular side having a multi-radius curve cross-section and an overhanging second rim disposed in parallel with the pan base, wherein foodstuffs accelerated up the second hemi-circular side, by simple manual action afforded to move the pan to one side, effects travel of the foodstuffs up a first arcuate section (having a first radius curve) and then up a second arcuate section (having a second radius curve shorter than the radius of the first radius curve) whereby inversion of the foodstuffs is facilitated across the second arcuate section for inverted deposit upon the slope of first arcuate section before said foodstuffs return to the base. Such action caused to roll the foodstuffs over minimizes the force of impact applied during inversion and enables inversion of even delicate foodstuffs intact.

The instant multi-curve rollover frying pan, therefore, includes a base with an exteriorly disposed cooking surface thereon. A first hemi-circular side circumferentially bounds one side of the pan and the second hemi-circular side circumferentially bounds the other side of the pan. The first hemi-circular side includes a first rim disposed apically atop the first hemi-circular side at an angle approximately normal the pan base. The second hemi-circular side, however, has a multi-radius curve cross-section whereby the curve of the second hemi-circular side when viewed in cross-section quickens towards a second rim; that is, the tangential derivative of the second hemi-circular side is seen to increase through 180° towards the second rim which is disposed in parallel with the frying pan base. Thus a tangent projected at points from the base along the cross-section curve of the second hemi-circular second side increases towards the vertical and then inverts back to the horizontal at the second rim.

The second hemi-circular side, therefore, includes at least a first arcuate section and a second arcuate section. The first arcuate section is disposed between the base and the second arcuate section and the second arcuate section is disposed between the first arcuate section and the second rim. The first arcuate section has a first radius curve and the second arcuate section has a second radius curve that is lesser than the radius of the first radius curve. Thus the tangential derivative of the second radius curve represents a greater rate of change of slope than the tangential derivative of the first radius curve comprising the first arcuate section. The result is a multi-radius curve cross-section that increases in slope gently at first (where proximal the base of the pan) and then quickens towards the second rim.

Importantly, the second rim is disposed overhanging towards the center of the pan in a plane approximately parallel the base of the pan. However, the second rim is not disposed over the base, but rather overhangs the first arcuate section. Foodstuffs accelerated across the rim are therefore inverted up the second arcuate section and directed back towards the center of the pan but deposited, not on the base, but on the slope of the first arcuate section before said foodstuffs return, under the influence of gravity, back to the pan base. Thus inversion is controlled to deposit the foodstuffs inverted on a slope whereby less force of impact occurs and even delicate foodstuffs are maintained intact without application of appreciable manual dexterity on behalf of the user.

An embodiment is contemplated wherein a handle, for grasping and wielding the multi-radius curve rollover frying pan, is attachable at each of at least a first position and a second position whereby ambidextrous use of the pan is enabled, as desired, depending on the user's handedness. For example, the first position whereat the handle is attachable is contemplated to be at the juncture between the first and second hemi-circular sides whereby the second hemi-circular side is disposed to one side of the user, for example, the left side. Thus a right-handed user may use force directed leftwards (in the direction of the user's thumb when grasping the handle) to readily effect inversion of foodstuffs within the pan. The second position whereat the handle is attachable is diametrically opposite the first position; that is, at the juncture of the first and second hemi-circular sides opposite the first position. Attachment of the handle at the second position, therefore, effectively rotates the pan through 180° whereby the second hemi-circular side is positioned on the other side of the user. Thus, in the above example, a left handed user grasping the pan by the handle when disposed in the second position is enabled inversion of foodstuffs with minimal dexterity and force applied by directing foodstuffs to said user's right.

Thus has been broadly outlined the more important features of the present mutli-radius curve rollover frying pan so that the detailed description thereof that follows may be better understood and in order that the present contribution to the art may be better appreciated.

Objects of the present mutli-radius curve rollover frying pan, along with various novel features that characterize the invention are particularly pointed out in the claims forming a part of this disclosure. For better understanding of the mutli-radius curve rollover frying pan, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 9 thereof, example of the instant mutli-radius curve rollover frying pan employing the principles and concepts of the present mutli-radius curve rollover frying pan and generally designated by the reference number 10 will be described.

Referring to FIGS. 1 through 9 a preferred embodiment of the present mutli-radius curve rollover frying pan 10 is illustrated.

The present multi-radius curve rollover frying pan 10 has been devised to enable controlled inversion of foodstuffs by simplified manual action in accelerating food across a cooking surface of the pan 10. As specifically illustrated in FIG. 6, the present multi-radius curve rollover frying pan 10 includes a cross-section having at least two radius curves along a second hemi-circular side, said cross-section comprising at least a first arcuate section (having a first radius) and a second arcuate section (having a second radius less than the first radius of the first arcuate section). Foodstuffs accelerated up the second hemi-circular side are gently folded over and inverted onto the first arcuate section before returning downslope to the cooking surface of the base. See for example the stages illustrated in FIGS. 8A, 8B, and 8C, and also FIGS. 9A and 9B. Simplified manual action, therefore, enables, expedient folding over of foodstuffs without significant forcing whereby even delicate foodstuffs (such as eggs, for example) are gently inverted without breaking.

Figure 1:
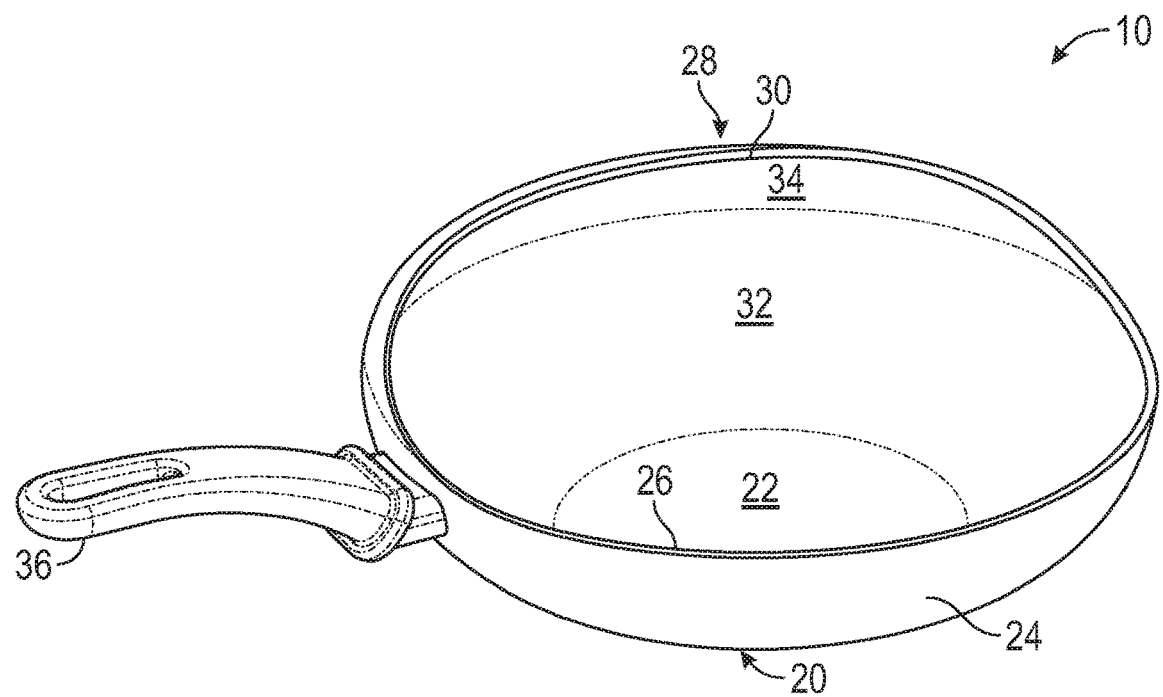
FIG. 1 is an isometric view of an example embodiment.
Figure 2:
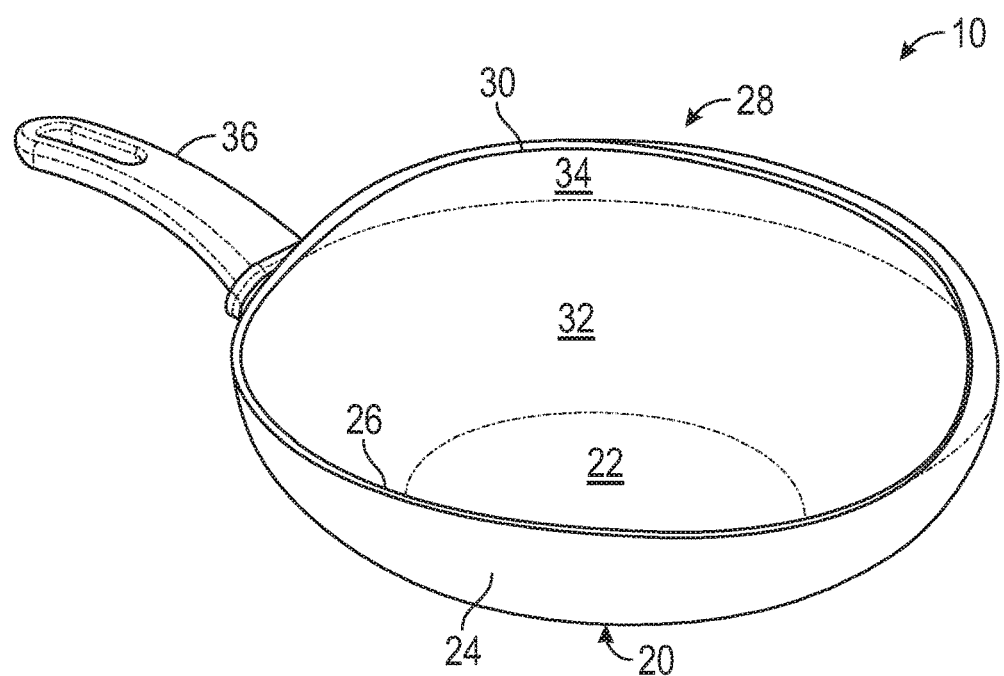
FIG. 2 is an isometric view of an example embodiment.
Figure 3:
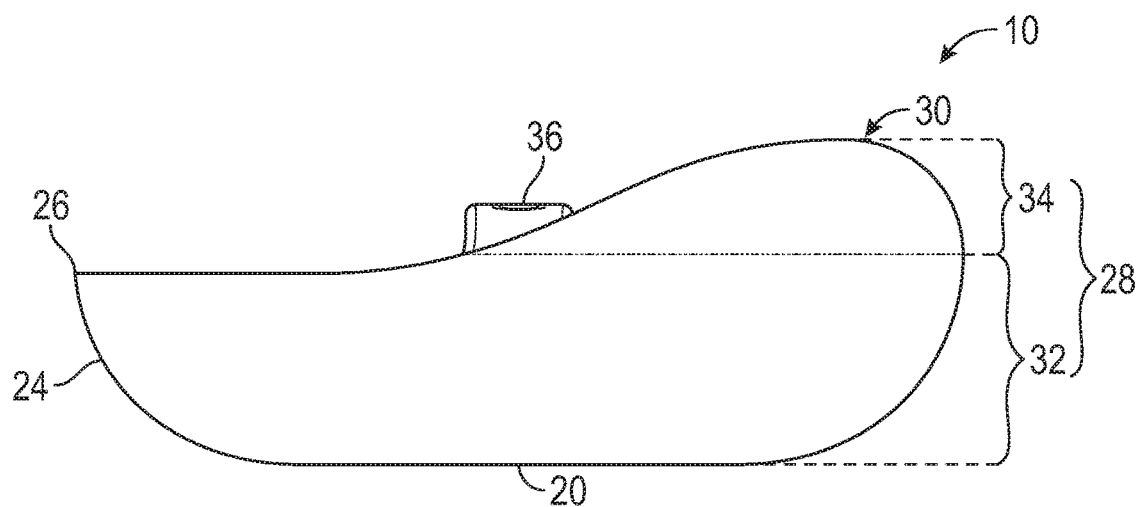
FIG. 3 is a front elevation view of an example embodiment.
Figure 4:
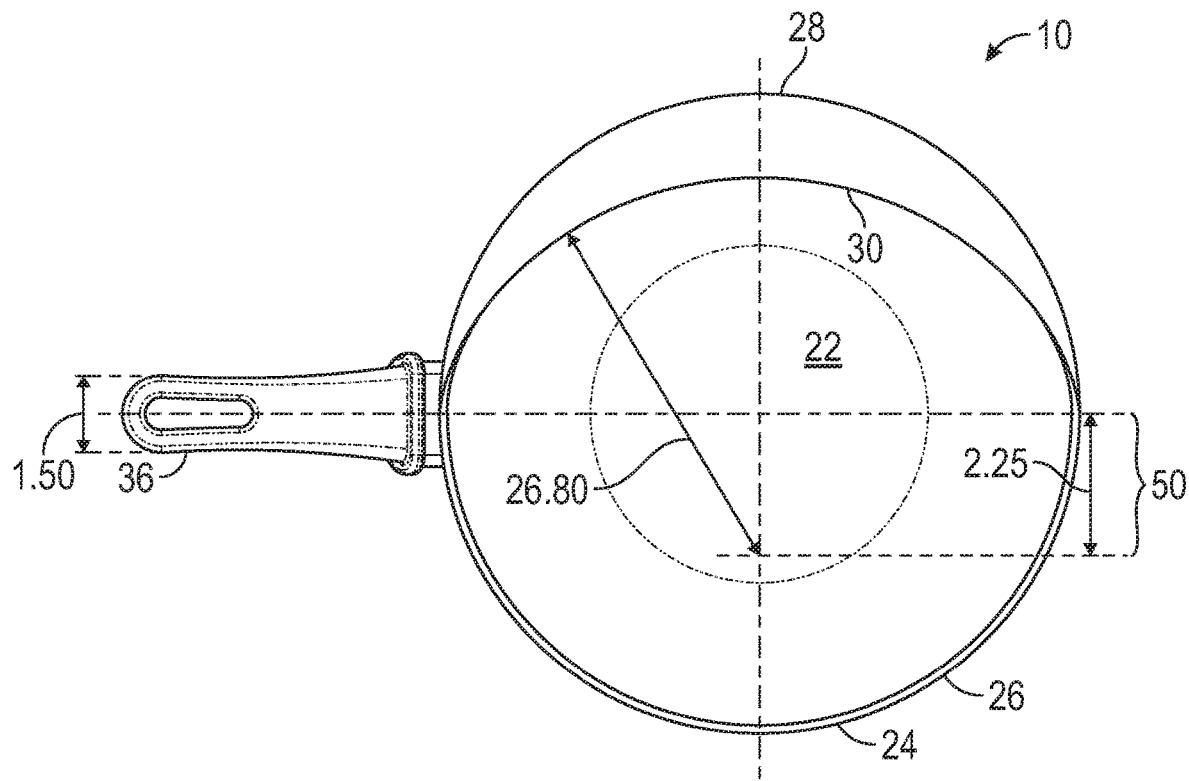
FIG. 4 is a top elevation view of an example embodiment and illustrating a multi-radius curve cross-section of a second hemi-circular side.
Figure 5:
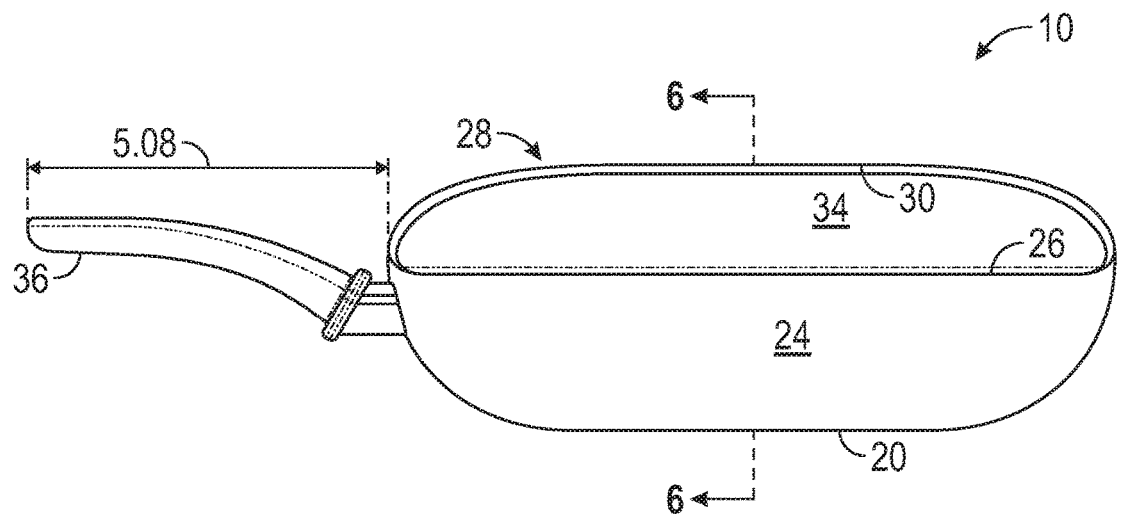
FIG. 5 is a right side elevation view of an example embodiment.

As shown in FIGS. 1 and 2, the present multi-radius curve rollover frying pan 10 includes a base 20 having a cooking surface 22. A first hemi-circular side 24 is disposed curved up from the base 20 circumferentially around one half of the base 20. A first rim 26 is disposed atop the first hemi-circular side 24, said first rim 26 disposed nearly normal the base 20 (see for example FIGS. 3 and 6). Thus the first hemi-circular side 24 represents a typical curved side of a frying pan regularly seen in the art, and approximates a quarter circumference of a circle.

A second hemi-circular side 28 is disposed circumferentially around the other half of the base 20. The second hemi-circular side 28 includes a mutli-radius curve cross-section 50 whereby the rate of change of the slope when taken in cross-section increases up the second hemi-circular side 28, ending at a second rim 30 disposed nearly in parallel with the base 20 but overhanging a first arcuate section 32 of the second semi-circular side 28, as will be described subsequently. See for example FIGS. 6, 8A, 8B, and 8C.

Figure 6:
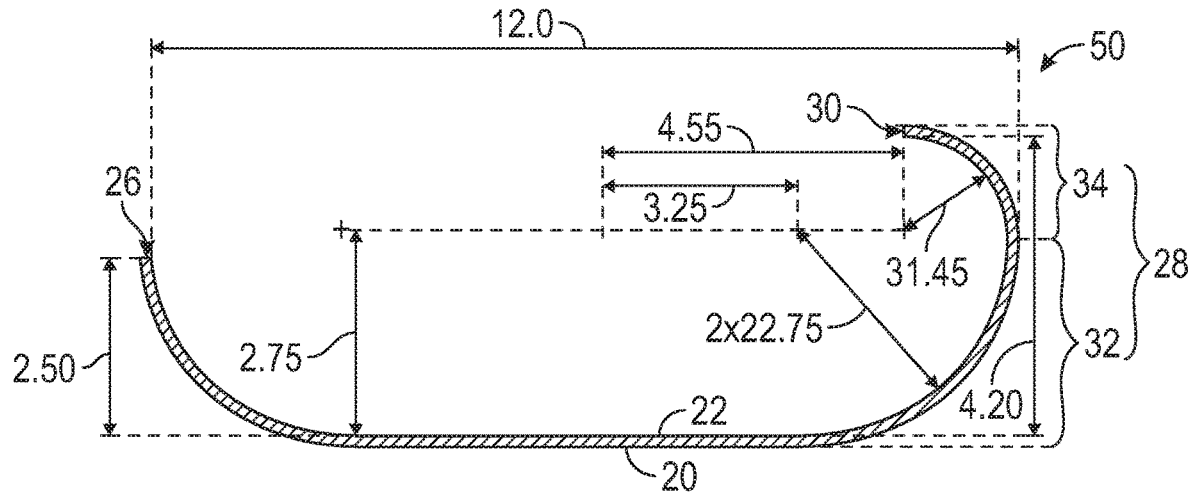
FIG. 6 is a cross-section view taken along the line A-A of FIG. 5 illustrating the multi-radius curve cross-section of the second hemi-circular side.
Figure 7:
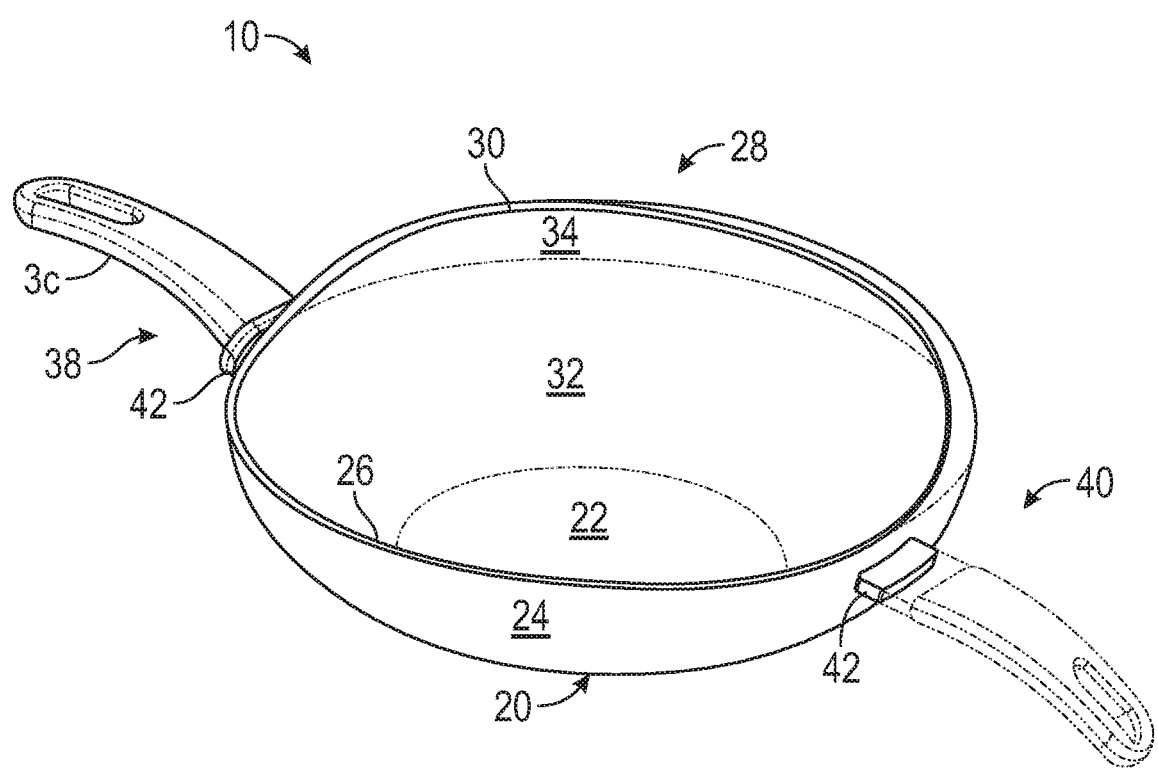
FIG. 7 is an isometric view of an example embodiment having an additional attachment point for a second position for an attachable handle whereby the embodiment is usable by both left-handed and right-handed users.
Figure 8A:
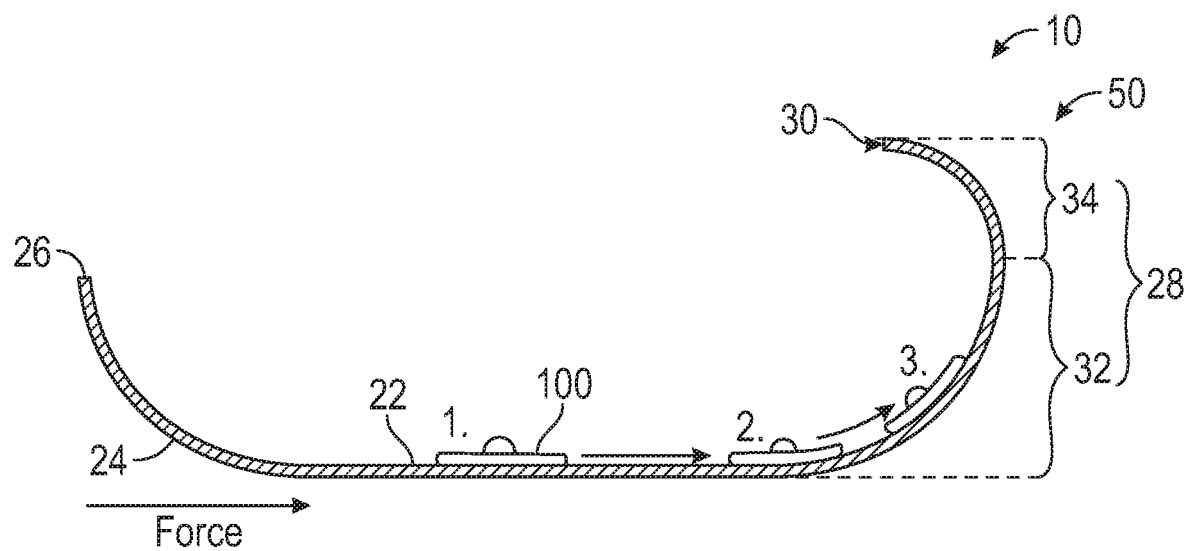
FIGS. 8A, 8B, and 8C, illustrate a path of inverting a foodstuff by causing the foodstuff to move up along the multi-curve cross-section of the second hemi-circular side whereby the foodstuff is gently rolled over and returned to a cooking surface.
Figure 8B:
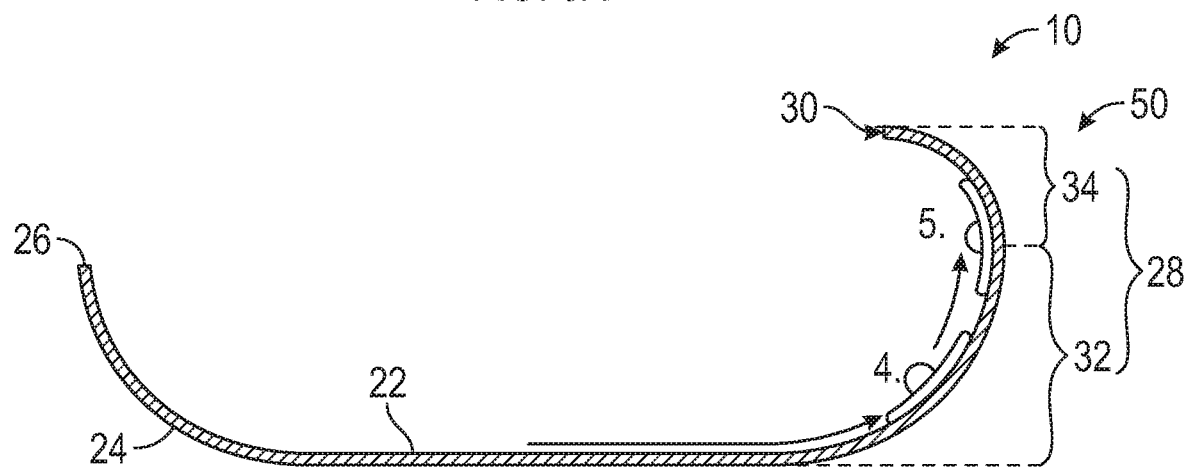
Figure 8C:
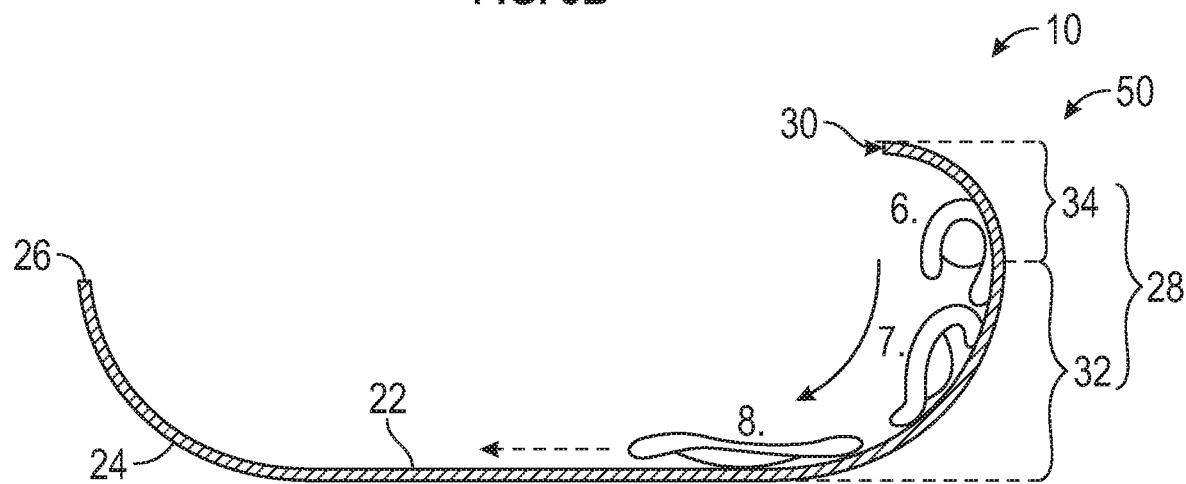
Figure 9A:
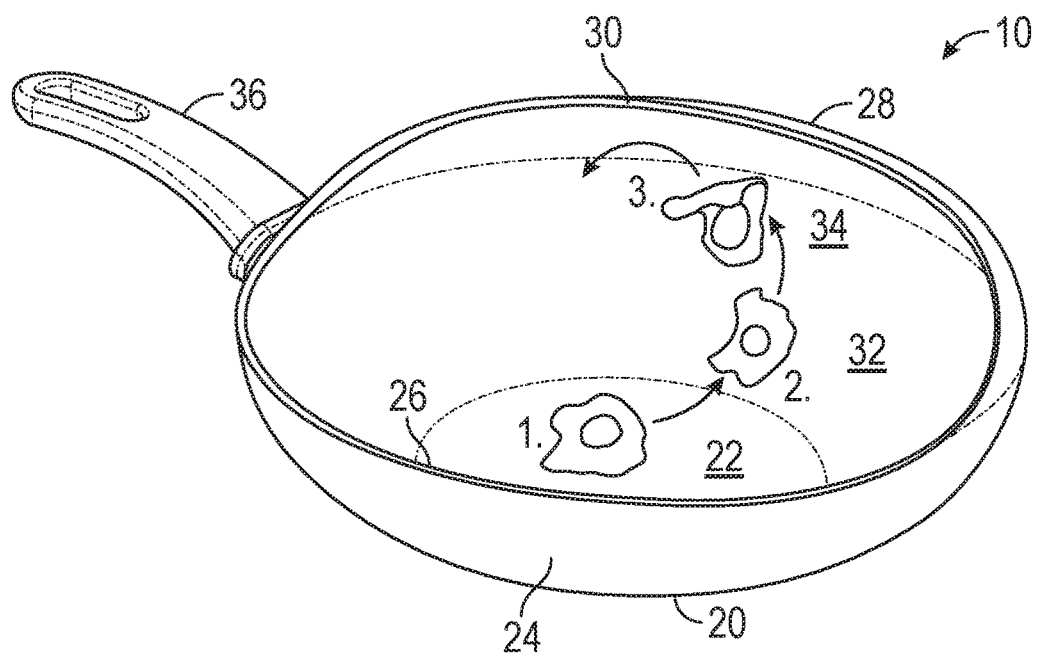
FIGS. 9A and 9B are an isomeric view illustrating the same path of inverting the foodstuff by causing the foodstuff to move up along the multi-curve cross-section of the second hemi-circular side whereby the foodstuff is gently rolled over and returned to the cooking surface.
Figure 9B:
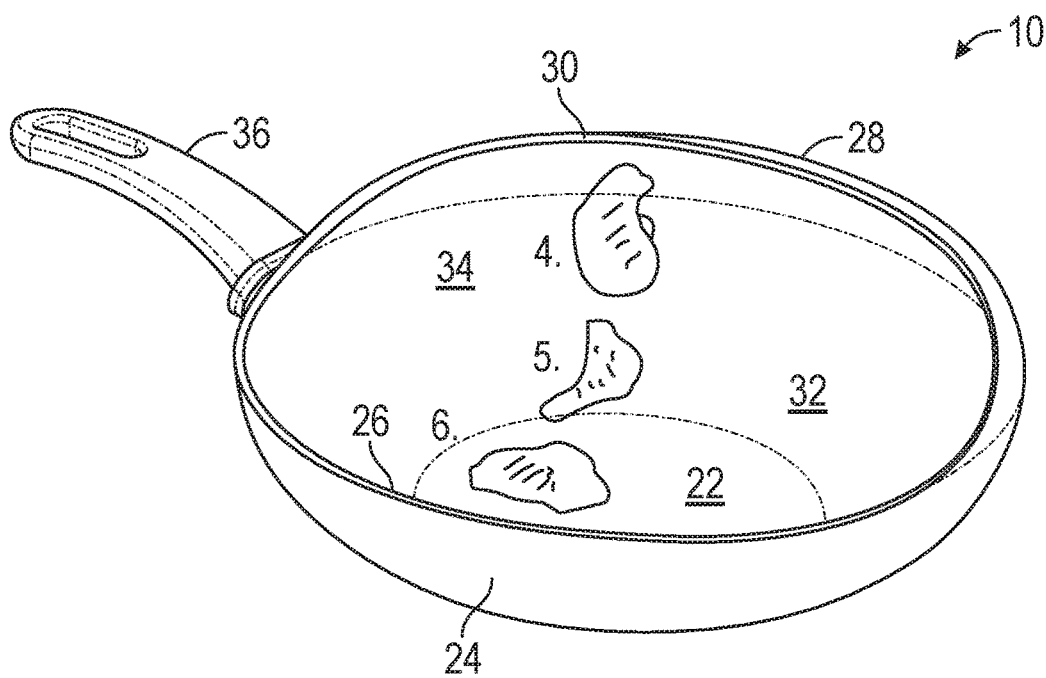

The multi-radius curve cross-section 50 of the second hemi-circular side 28, therefore, includes a first arcuate section 32 and a second arcuate section 34 disposed atop the first arcuate section 32. The first arcuate section 32 has a first tangential derivative increasing at a constant rate and the second arcuate section 34 has a second tangential derivative increasing at a constant rate that is greater than the rate of change of the first tangential derivative of the first arcuate section 32. The second arcuate section 34 terminates apically at a second rim 30 disposed atop the second hemi-circular side 28. Due to the relationship of the second arcuate section 34 relative to the first arcuate section 32, the second rim 30 is disposed overhanging the second hemi-circular side 28 above the first arcuate section 32 in a plane approximately parallel the base 20. Example dimensions defining this overall relationship and the multi-curve cross-section 50 are shown in FIG. 6.

Thus the slope of the cross-section of the second hemi-circular side 28 increases along at least a two-radius curve whereby foodstuffs 100 accelerated up the second hemi-circular side 28 are folded over, to gently rollover and invert upon the slope of the first arcuate section 32 before returning under the influence of gravity to the cooking surface 22 of the base 20. Inversion of the foodstuffs 100 is thereby controlled, to minimize separation of the foodstuffs 100 from contact with the pan 10 and to prevent forcible impact between surfaces of largely divergent slope, whereby breakage of even delicate foodstuffs is minimized. See for example FIGS. 8A, 8B, and 8C, and stages 1 through 8 exemplifying the controlled rollover inversion effected along the multi-curve cross-section 50. Even minimal force, therefore, is effective in controlling inversion of foodstuffs 100.

Simple sideways motions of the pan 10 effected manually to accelerate foodstuffs 100 up the second hemi-circular side 28, therefore, gently invert foodstuffs 100 traveling up the second hemi-circular side 28 to restore said foodstuffs 100, inverted, to the first arcuate section 32. Food is prevented from accelerating over the second rim 30 because the second rim 30 is disposed approximately parallel to the base 20 whereby foodstuffs accelerated up the second hemi-circular side 28 are directed towards the center of the pan 10, rolling over upon the first arcuate section 32 before returning to the base 20 of the pan 10. Thus minimal dexterity is required to gently rollover foodstuffs 100 when wielding the present multi-radius curve rollover frying pan 10, and even excessive force accelerates the stages illustrated in FIGS. 8A, 8B, and 8C, whereby foodstuffs 100 are rolled over and minimal separation of the foodstuffs 100 from contact with the pan 10 is maintained. This lessens any force of impact when inverting the foodstuffs 100 and renders a significant improvement over the prior art.

For manual control of the instant multi-radius curve rollover frying pan 10, at least one handle 36 is disposed at a first position 38 at the juncture between the first hemi-circular side 24 and the second hemi-circular side 28. A further embodiment is contemplated, illustrated in FIG. 7, wherein the handle 36 is further attachable at a second position 40, disposed at the juncture between the first hemi-circular side 24 and the second hemi-circular side 28 in a second position 40 disposed diametrically opposite the first position 38. Attaching the handle 36 at this second position 40, therefore, enables ambidextrous use of the present multi-radius curve rollover frying pan 10 whereby a user is enabled to effectively position the second hemi-circular side 28 to said user's left or right preferentially according to said user's dexterity and handedness. See FIG. 7.

In at least one embodiment contemplated herein, the handle 36 attaches at each of the first and second positions 38, 40 by engagement with an attachment point 42 devised to releasably interconnect with the handle 36 expediently by spring-loaded or other manually interactive securable mechanism.

What is claimed is:

1. A multi-radius curve rollover frying pan comprising:
a base having a cooking surface;
a first hemi-circular side;
a first rim disposed atop the first hemi-circular side,
a second hemi-circular side, said second hemi-circular side having a mutli-radius curve cross-section, said multi-radius curve cross-section having:
a first arcuate section, said first arcuate section having a first tangential derivative increasing at a constant rate;
a second arcuate section disposed atop the first arcuate section, said second arcuate section having a second tangential derivative increasing at a constant rate greater than a rate of change of the first tangential derivative of a first arcuate section; and
a second rim disposed atop the second hemi-circular side, said second rim disposed overhanging the second side above the first arcuate section approximately parallel the base;
wherein a slope of the cross-section of the second hemi-circular side increases along at least two radius curves whereby foodstuffs accelerated up the second hemi-circular side are folded over to invert upon the second arcuate section before returning to the cooking surface of the base.

2. The multi-radius curve rollover frying pan of claim 1 further comprising at least one handle disposed at a first position at a juncture between the first hemi-circular side and the second hemi-circular side.

3. The multi-radius curve rollover frying pan of claim 2 wherein the handle is further to attachable at a second position at the juncture between the first hemi-circular side and the second hemi-circular side in a position opposite the first position.

4. The multi-radius curve rollover frying pan of claim 3 wherein the handle attaches at each of the first and second positions by engagement with an attachment point devised to releasably interconnect with the handle.

* * * * *

UNITED STATES PATENT AND TRADEMARK OFFICE
CERTIFICATE OF CORRECTION

PATENT NO.         : 10,517,430 B1
APPLICATION NO.    : 16/104429
DATED              : December 31, 2019
INVENTOR(S)        : Kenneth J. Trzcinski Page 1 of 1

It is certified that error appears in the above-identified patent and that said Letters Patent is hereby corrected as shown below:

On the Title Page

Items (71) and (72):
"Hillrose, OH" should read, --Hillrose, CO--

Signed and Sealed this
Tenth Day of November, 2020

Andrei Iancu
*Director of the United States Patent and Trademark Office*